United States Patent [19]

Hallstrom, Jr.

[11] Patent Number: 4,727,978

[45] Date of Patent: Mar. 1, 1988

[54] RECIPROCATING CONVEYOR FOR PARTICULATE MATERIAL

[76] Inventor: Olof A. Hallstrom, Jr., 1920 Hallstrom Rd., Tillamook, Oreg. 97141

[21] Appl. No.: 850,645

[22] Filed: Apr. 11, 1986

[51] Int. Cl.$^4$ ............................................. B65G 25/04
[52] U.S. Cl. ..................................... 198/737; 198/750
[58] Field of Search ................ 198/737, 750; 414/507, 414/509, 525 B

[56] References Cited

U.S. PATENT DOCUMENTS

| | | | |
|---|---|---|---|
| 3,838,769 | 10/1974 | Fishburne et al. | 198/750 |
| 4,144,963 | 3/1979 | Hallstrom | 198/750 |
| 4,474,285 | 10/1984 | Foster | 198/750 |
| 4,492,303 | 1/1985 | Foster | 414/525 B X |
| 4,611,708 | 9/1986 | Foster | 198/750 |

Primary Examiner—Nancy J. Stodola
Attorney, Agent, or Firm—Olson and Olson

[57] ABSTRACT

A reciprocating conveyor is formed of at least one group of at least three elongated slats of inverted U-shape spaced apart laterally for longitudinal reciprocation in such manner that all or a majority of slats move simultaneously in a load conveying direction and sequentially in the opposite, retracting direction. A seal member is secured to one side section of each slat and extends laterally therefrom to a position closely adjacent the facing side section of the adjacent slat. The fines of particulate material being conveyed as a load gravitate downward past the free side of the seal member and are deposited in a trough that underlies each pair of facing side sections of adjacent slats. As the adjacent slats move simultaneously in the load conveying direction, the corresponding pair of facing side sections move the fines in the trough in the same direction. This movement is enhanced by providing fines pusher members on the lower ends of the side sections of the slats.

10 Claims, 5 Drawing Figures

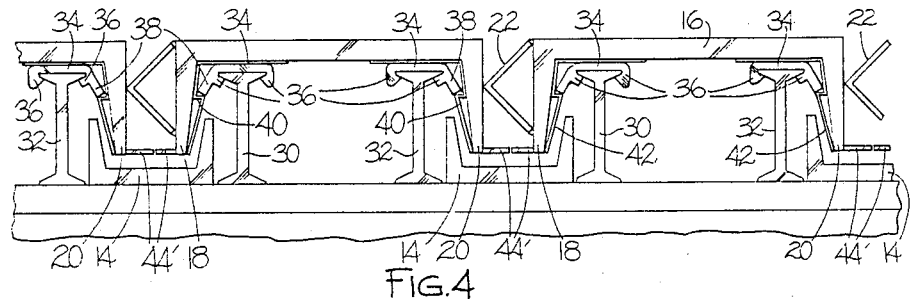
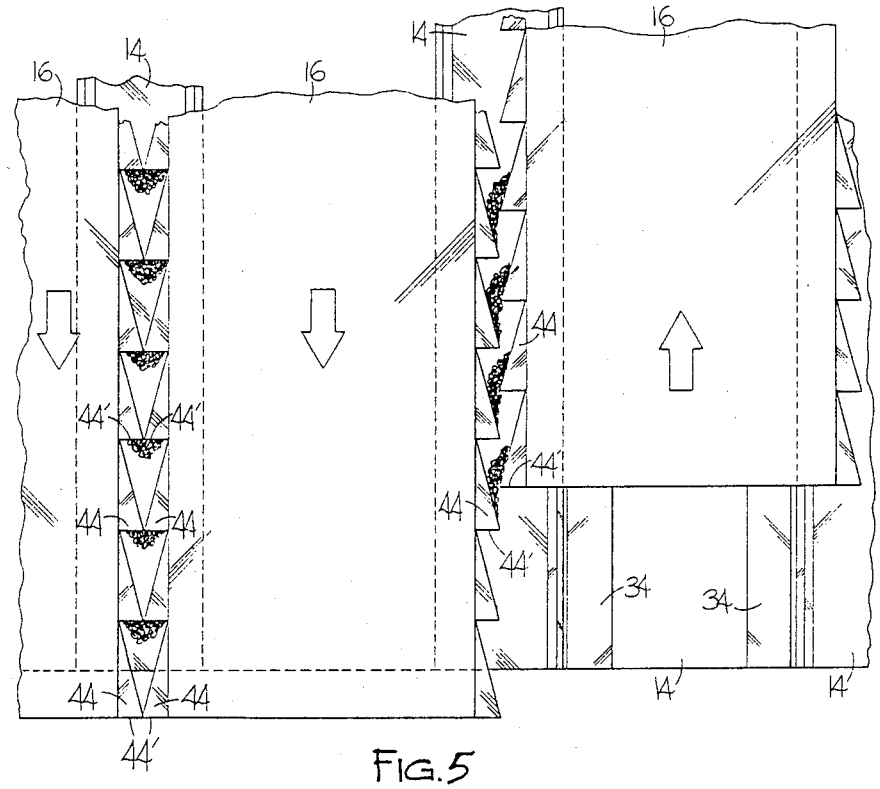

RECIPROCATING CONVEYOR FOR PARTICULATE MATERIAL

BACKGROUND OF THE INVENTION

This invention relates to reciprocating conveyors, and more particularly to a reciprocating conveyor especially suitable for the conveying of particulate materials.

My earlier U.S. Pat. Nos. 3,534,875; 4,143,760; 4,144,963; and 4,184,587 disclose reciprocating conveyors particularly suitable for the conveying of packaged goods, bulk farm crops and non-abrasive particulate materials. Although those conveyors are highly effective for those purposes, they are inefficient in conveying such abrasive particulate materials as sand, solid particles in sewage and others, because the seals between adjacent conveyor slats do not prevent the escape of such materials and also do not withstand the destructive abrasion of such materials.

SUMMARY OF THE INVENTION

The reciprocating conveyor of this invention utilizes a plurality of groups each of at least three elongated, longitudinally reciprocative, laterally spaced slats of inverted U-shaped cross section driven in such manner that all or a majority of the slats of each group move simultaneously in a load conveying direction and move sequentially in the opposite, retracting direction, the mutually facing side sections of adjacent slats registering with an underlying elongated fines removal trough. An elongated seal member is secured along one edge to one of the facing sides of each adjacent pair of slats with the opposite, free side of the seal member positioned closely adjacent the other facing side of the pair of slats. During reciprocation of the slats, the fines of particulate material work downward around the free side of each seal member and drop into the fines removal trough. As the adjacent slats move simultaneously in the load conveying direction, the adjacent side sections cooperate to move the fines in the trough in the same conveying direction to the discharge end of the trough.

It is the principle objective of this invention to provide a reciprocating conveyor particularly suitable for the efficient conveying of solid particulate material.

Another objective of this invention is the provision of a reciprocating conveyor of the class described in which means is included for allowing the escape and subsequent recovery of the fines of solid particulate materials.

Still another objective of this invention is the provision of a reciprocating conveyor of the class described in which means is included for accelerating the movement of recovered fines of solid particulate materials to a recovery station.

A further object of this invention is the provision of a reciprocating conveyor of the class described which is of simplified construction for economical manufacture, maintenance and repair.

The foregoing and other objects and advantages of this invention will appear from the following detailed description taken in connection with the accompanying drawings of preferred embodiments.

BRIEF DESCRIPTION OF THE DRAWINGS

FIG. 4 is a fragmentary front elevation illustrating a third embodiment of the reciprocating conveyor of this invention.

FIG. 5 is a fragmentary plan view as viewed from the top in FIG. 4, with the seals between adjacent slats removed to disclose details of fines removal mechanism.

DESCRIPTION OF THE PREFERRED EMBODIMENTS.

Figure 1:
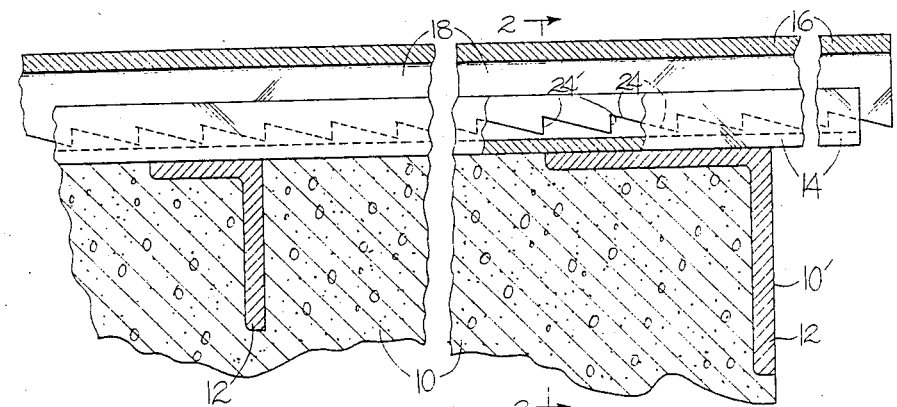
FIG. 1 is a fragmentary, foreshortened longitudinal section of a reciprocating conveyor embodying the features of this invention.
Figure 2:
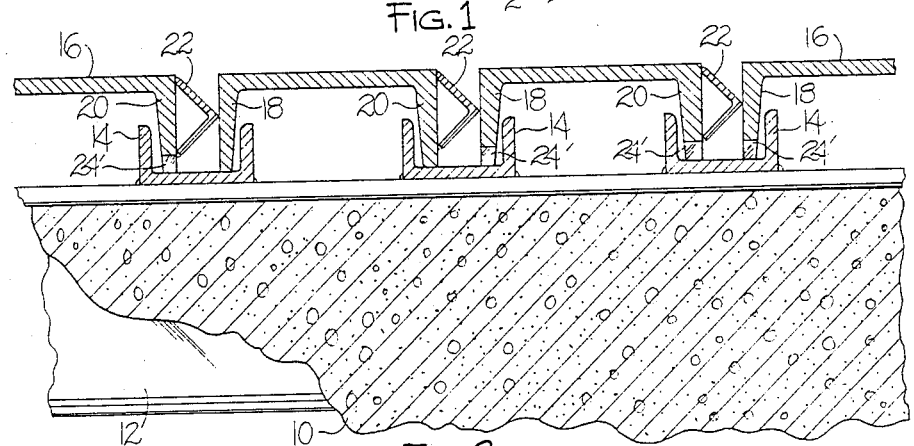
FIG. 2 is a fragmentary transverse sectional view taken on the line 2—2 in FIG. 1.

In the embodiment illustrated in FIGS. 1 and 2, a base floor 10 of concrete, reinforced by angle irons 12, is shown to be elevated at an outfeed end 10' for access to the gravity outfeed of the conveyor by a truck, conveyor, or other suitable output conveyance.

A plurality of laterally spaced, elongated, fines recovery troughs 14 of U-shaped cross-section are welded to the angle irons 12 and or otherwise secured to and supported by the base 10. As illustrated in FIG. 1, the troughs preferably project beyond the outfeed end 10' of the base.

A plurality of laterally spaced, elongated, parallel, reciprocating conveyor slats of inverted U-shaped cross-section, each provide an intermediate, upwardly facing, load-supporting section 16 and laterally spaced, downwardly extending side sections 18 and 20. The side section 18 of one slat and side section 20 of the next adjacent slat form a pair of mutually facing side sections, and each such pair is disposed above and in registry with an associated trough 14.

An elongated seal member 22, shown as V-shaped in cross-section, is secured along its spaced edges to one side section, for example section 20, of each pair of mutually facing side sections, and spans the space therebetween, terminating at its apex in sliding contact or otherwise closely adjacent the other side section, for example section 18 of the mutually facing pair.

As in my earlier patents mentioned previously, the conveyor slats are driven to reciprocate longitudinally on a sequence predetermined to move a load longitudinally in a conveying direction. This may be achieved by moving all of the slats simultaneously in the conveying direction and then moving each slat sequentially in the opposite, retracting direction. Alternatively, a majority of the slats may be moved simultaneously in the load conveying direction while the remaining slats are moved in the opposite, retracting direction.

During movement of all or a majority of the slats in the conveying direction, any fines material that has filtered downward by gravity past the free side of seal member 22 into the trough 14, is moved by the pairs of mutually facing side sections 18, 20 in the same conveying direction, toward the outfeed end of the troughs 14. The fines dispensed from the outfeed ends of the troughs are collected either separately or in combination with the bulk of particulate material outfed by the slats.

In the embodiment of FIGS. 1 and 2, means preferably is provided for assisting the outfeed movement of fines along the troughs. This means is provided by serrating the lower edges of the side sections 18 and 20 to form a series of wedge-shaped pusher members 24. The wide ends 24' of the pusher members face and are disposed substantially perpendicular to the conveying direction of movement of the slat members, whereby they function as blades to push the fines material in the troughs toward the outfeed end thereof. The sloping, trailing edges of the wedge-shaped pusher members merely push the fines material aside laterally during the retracting movement of the slats.

Figure 3:
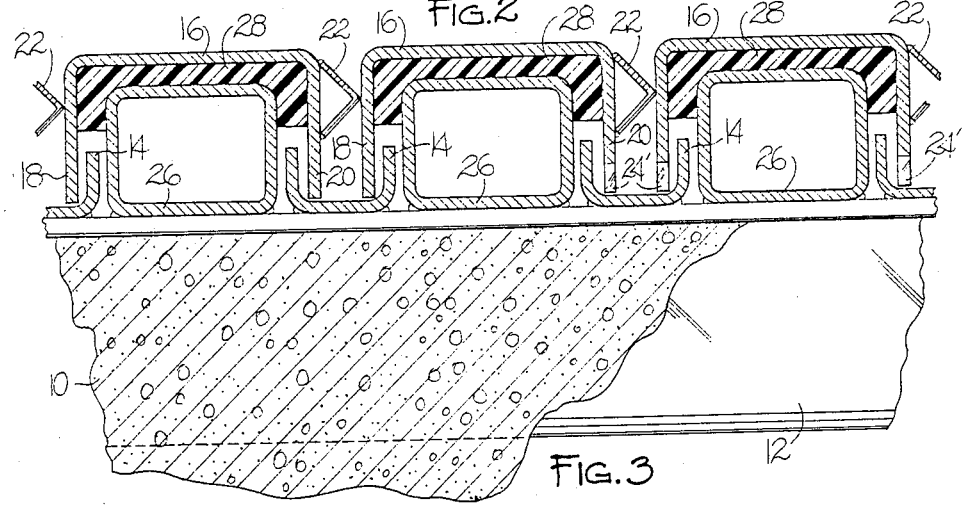
FIG. 3 is a fragmentary transverse sectional view, similar to FIG. 2, illustrating a second embodiment of the reciprocating conveyor of this invention.

In the embodiment illustrated in FIG. 3, each slat is supported by an elongated tubular support member 26 mounted on the floor base 10 in between adjacent troughs 14. A bearing member 28 of a material providing reduced co-effecient of friction, is interposed between each support member 26 and the overlying slat. The bearing member may extend the full length of the support member 26 and slat, in which case it may be secured either to the support member 26 or to the slat. Alternatively, the bearing member may be provided as a plurality of short sections secured at longitudinally spaced intervals to the support member 26.

In the embodiment of FIG. 3, it is to be noted that the side sections 18 and 20 of the slats are elevated out of sliding contact with the troughs 14, whereby to eliminate wear of both components. The lower portions of the side sections preferably are provided with the same type of wedge-shaped pusher members 24 as in the embodiment of FIGS. 1 and 2.

In the embodiment of FIGS. 4 and 5, each tubular support member 26 of FIG. 3 is replaced with a pair of elongated I-beams 30 and 32 spaced apart laterally and underlying each slat. The bearing member 28 of FIG. 3 is replaced with a bearing member 34 for each I-beam. The bearing member 34 is provided with resilient fingers 36 extending downwardly and angularly inward from opposite lateral sides of the bearing member for releasably clamping between them the opposite lateral sides of the associated I-beam.

The laterally outer side of each bearing member 34 also is provided with an outwardly and downwardly extending resilient locking tab 38 arranged to releasably engage a locking ledge 40 on the confronting side section 18 or 20 of the associated slat. The slat thus is secured releasably to the bearing member 34, and hence to the I-beams, against vertical displacement.

The ledge 40 may be formed as a contoured inner surface of the side section 18 or 20. In the preferred embodiment illustrated and best shown in FIG. 4, the ledge is provided by an elongated resilient strap 42 secured at its opposite side edges, as by welding, to the intermediate section 16 and associated side section 18 or 20. Intermediate its sides, the strap is bent longitudinally to form the laterally projecting ledge 40 located adjacent the associated side section of the slat for cooperative association with the locking tab 38.

In the embodiment of FIGS. 4 and 5, the wedge-shaped fines pusher members 44 are provided by serrated strips secured to the lower ends of the side sections 18 and 20 and extending laterally outward, horizontally therefrom. The wide end 44' of each pusher member faces and is disposed substantially perpendicular to the conveying direction of movement of the slat members, as in the embodiment of FIGS. 1 and 2, to function as blades to push the fines material in the troughs toward the outfeed ends thereof.

In this latter regard, it is to be noted in FIG. 5 that the adjacent pair of slats at the left side of the figure are moving simultaneously in the load conveying direction, as indicated by the arrows. During this movement, the pusher members 44 on the mutually facing side sections of the slats are arranged in alignment, whereby to cooperate in moving the fines material in the trough in the direction of load conveying movement of the slats.

The slat at the right in FIG. 5 is shown by an arrow to be moving in the opposite, retracting direction. During this movement the fines material in the trough is moved laterally in the trough by the camming action of the tapered edge of each wedge-shaped pusher member.

It will be understood that the foregoing fines removal operation of the horizontally disposed pusher members 44 is also produced by the vertically disposed pusher members 24 in the embodiments of FIGS. 1, 2 and 3.

From the foregoing, it will be appreciated that the present invention provides a reciprocating conveyor especially suited to the conveyance of particulate materials, especially solids particulates of abrasive character such as sand, mineral ores, sewage and others. For some materials, such as sewage, it is preferred that the longitudinal dimension of the conveyor slats and associated components be disposed at a slight downwardly sloping angle to accommodate the gravity flow of the liquid component of sewage.

It will be apparent to those skilled in the art that various changes may be made in the size, shape, type, number and arrangement of parts described hereinbefore, without departing from the spirit of this invention and the scope of the appended claims.

Having now described my invention and the manner in which it may be used, I claim:

1. A reciprocating conveyor, comprising:
   (a) a base,
   (b) at least one group of at least three elongated parallel slat members each of inverted U-shaped cross section defining an intermediate load-bearing support section and a pair of laterally spaced, downwardly extending side sections, the slat members being spaced apart laterally above the base for longitudinal reciprocation on a sequence wherein at least a majority of the slat members are moved simultaneously in the same direction to move a load longitudinally in a conveying direction and a minority of the slat members are moved in the opposite direction to retract the slat members without retracting a load, the adjacent side sections of adjacent slat members forming a pair of mutually facing side sections,
   (c) an elongated fines removal trough underlying each pair of said mutually facing side sections, whereby fines collected in said trough are moved along the latter during simultaneous movement of the associated pair of mutually facing side sections in the load-conveying direction of the slat members, and
   (d) an elongated seal member secured to one side section of each said pair of mutually facing side sections and extending laterally therefrom to a position closely adjacent the other side section of the pair.

2. The reciprocating conveyor of claim 1 including fines conveying assisting means on the lower ends of the side sections of the slat members for assisting said side sections in moving fines material in the troughs in the conveying direction of movement of the slat members.

3. The reciprocating conveyor of claim 2 wherein the fines conveying assisting means comprise wedge-shaped members extending throughout the length of said side sections, each wedge-shaped member having a wide end and a narrow end, the wide ends of the wedge-shaped members facing and disposed substantially perpendicular to the conveying direction of movement of the slat members.

4. The reciprocating conveyor of claim 3 wherein the wedge-shaped members are formed by serrated lower edges of the side sections of the slat members, the wide ends of the wedge-shaped members being disposed substantially vertically.

5. The reciprocating conveyor of claim 3 wherein the wedge-shaped members extend laterally and substantially horizontally from the lower edges of the side sections of the slat members.

6. The reciprocating conveyor of claim 1 including elongated support means on the base underlying each slat member between adjacent fines removal troughs, and an elongated friction-reducing bearing member interposed between each support means and the associated slat member for movement of the slat member relative to the support means, the bearing member supporting the associated slat member with its side sections spaced above the associated fines removal trough.

7. The reciprocating conveyor of claim 6 wherein the elongated bearing member includes a laterally outward and downwardly extending resilient locking tab and the inner side of the adjacent slat side section includes a locking ledge arranged for engagement by said locking tab, whereby to secure the slat member against vertical displacement relative to the support means.

8. The reciprocating conveyor of claim 7 wherein the locking ledge comprises an elongated strap secured to the inner side of the slat member and having a laterally offset portion defining a locking ledge.

9. The reciprocating conveyor of claim 6 including resilient finger members extending downward from opposite sides of the bearing member for releasable clamping engagement with opposite lateral sides of the associated support means.

10. The reciprocating conveyor of claim 6 wherein the support means comprise a pair of laterally spaced I-beams, a bearing member is mounted on each I-beam, resilient finger members extend downwardly from opposite sides of each bearing member for releasable clamping engagement with opposite lateral sides of the associated I-beam, and a laterally and downwardly extending resilient locking tab on each bearing member engages a locking ledge on the inner side of the adjacent slat side section for securing the slat member against vertical displacement relative to the I-beams.

* * * * *